April 23, 1946.　　H. GENT ET AL　　2,398,782
ELECTRICAL JUNCTION SYSTEM
Filed Nov. 17, 1942　　2 Sheets-Sheet 1
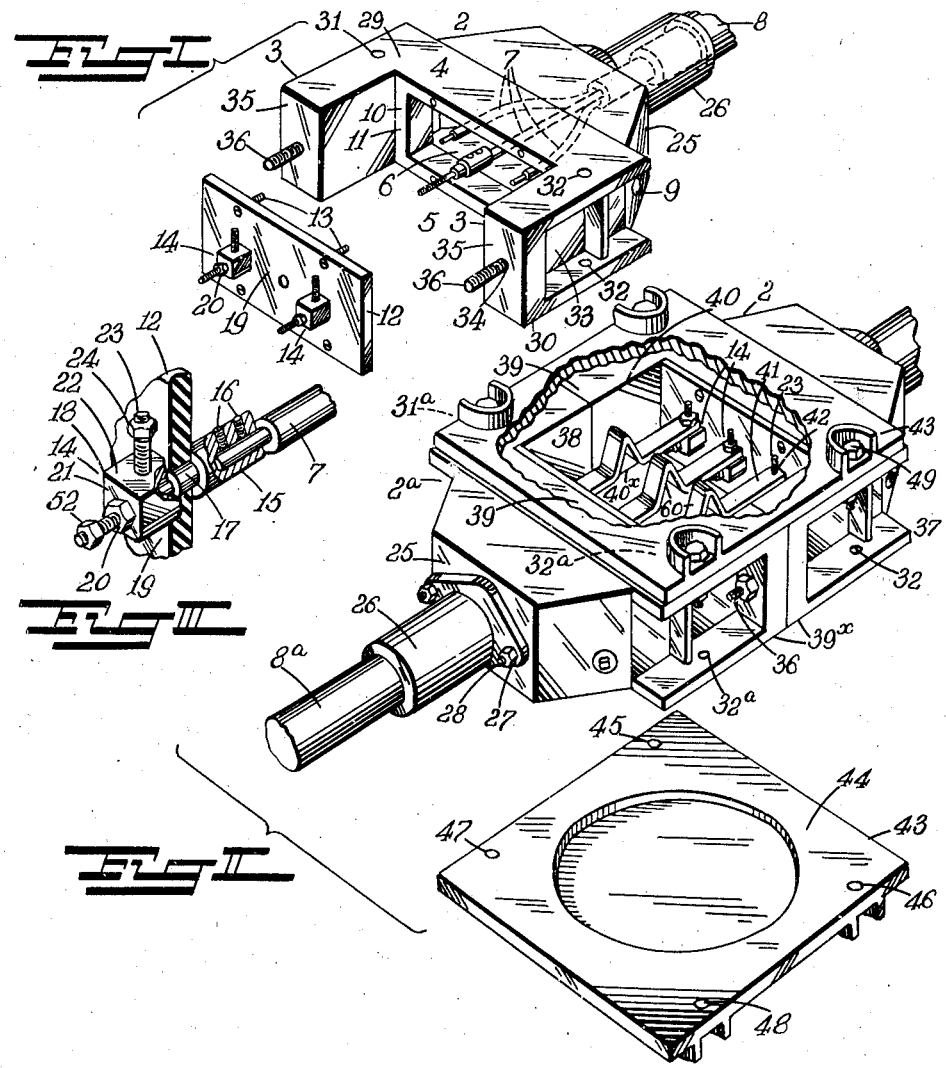
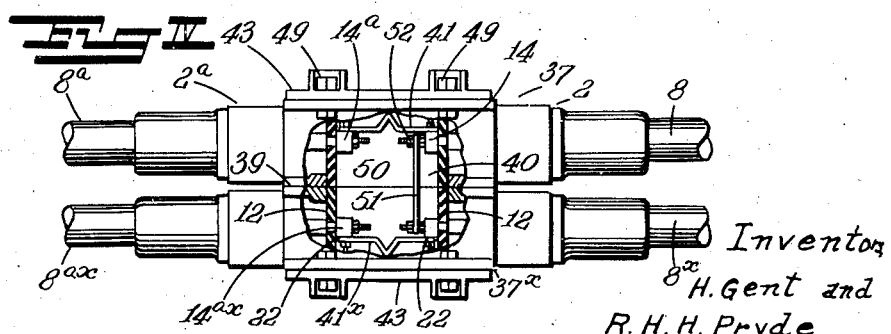
Inventors
H. Gent and
R. H. H. Pryde
By Young, Emery & Thompson
Attorneys

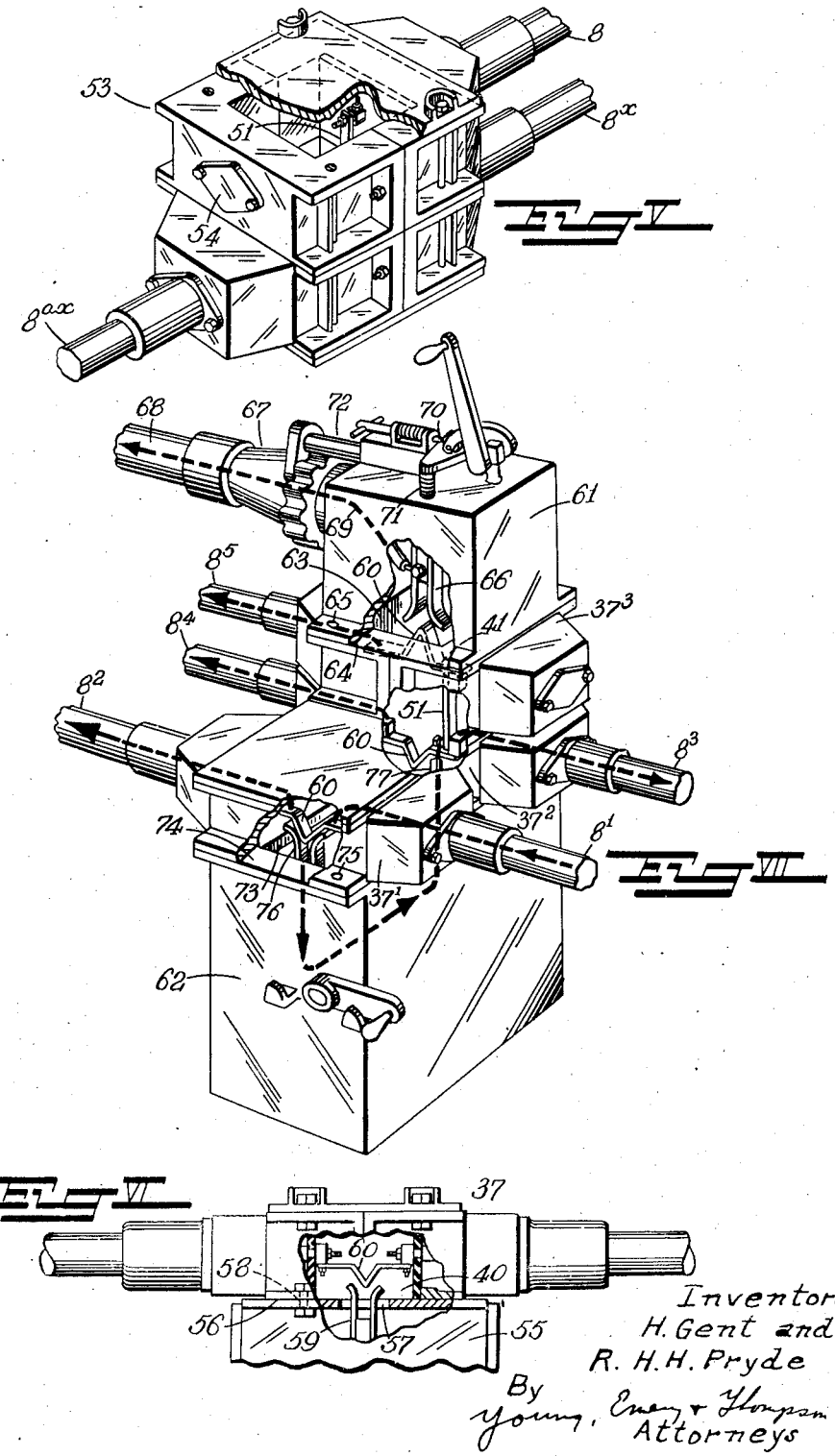

Patented Apr. 23, 1946

2,398,782

UNITED STATES PATENT OFFICE 2,398,782

ELECTRICAL JUNCTION SYSTEM

Harry Gent and Robert Hamilton Hope Pryde, Coalville, Transvaal, Union of South Africa Application November 17, 1942, Serial No. 465,900
In the Union of South Africa April 15, 1942

8 Claims. (Cl. 174—50)

The present invention relates to electrical junction systems for connecting cables and particularly to such systems of the kind provided for installation in coal and other mines where the system requires to be extended and altered from time to time in accordance with changes in the mining conditions.

It is a desideratum in such systems that connections for a variety of purposes may be made and broken down rapidly; and with the fewest kinds of connecting units; and it is a further desideratum that the connecting units should occupy as little space as possible, both individually and when combined. It is an object of the invention to meet these requirements.

A commonly used connecting unit for a system of the kind above described, is one of box shape with a bolted-on cover for closing its otherwise open front face. Some or all of the walls of the box around the front face are provided with means for bringing in cables in lateral directions and so that the separated leads of each cable can be connected to their corresponding terminal set within the box. The cables are connected within the cavity or chamber of the box by links joining the selected terminal sets. After the links are thus put into position, they and the terminals are completely enclosed in the chamber by the cover being bolted in place. It is evident that if the box is four sided, four cables at the most can be connected; or three cables and another unit of the system such as a switch.

Another well known form of cable connecting unit is a cable end coupler that is mechanically secured to its cable length, and has the separate cable leads sealed in it and secured to a set of terminals with which the coupler is provided, before the cable is taken underground when that is its destination. The coupler is so constructed that it can be bolted onto another unit of the system such as an automatic circuit breaker; and also that the couplers of two cables can be bolted directly to one another, without an intervening junction box, to make a straight through connection between the cables. The electrical connection is made by means of links joining the respective terminal sets; and said terminal sets and links are enclosed by means of a box-shaped cover of appropriate lateral extent to cover in the otherwise exposed electrical elements of both couplers. The result is that the combination of the box cover with the joined couplers provides an enclosed chamber space within which the terminals and links are totally enclosed, as in the junction box mentioned in the preceding paragraph. The couplers are further constructed to enable another or others of the same pattern to be secured laterally to the first coupled pair in order to form a three- or four-way coupling; and a different pattern of cover is provided for each such different assembly of the couplers. In this way the chamber space can be expanded laterally according to the number of connections to be made, and all the links and terminals are enclosed within the single chamber.

A specific object of the invention is to provide a junction box of simple form, adapted to combine with other units of a cable junction system, including duplicates of itself; and thereby to provide for the expansion of the enclosed chamber space, as in the last mentioned example, but providing for such expansion to an indefinite extent and in a direction more convenient than the lateral direction.

A junction box according to the invention is characterized by being constructed as a frame open at opposite faces and surrounding a chamber space, the sides of the frame providing means for the connection of one or more cables thereto with their leads extending to the chamber space, each such opposite face being formed with connective formation surrounding the aperture of the face, whereby either such face may be connected to one of the faces of another box having the characteristics here specified. When such connection has been made, the second face aperture which is for the time being uncovered, is available for making the link connections in the box.

The connective formation is one adapted to make connection face to face with a duplicate of itself; and conveniently comprises a plane contact face and holes for bolts or studs extending transversely to said plane face and arranged in a standard pattern.

These features enable an indefinite number of the boxes to be assembled face to face as a series extending in the direction transversely to the faces and surrounding a common chamber space within which the link connections can be made. Said chamber space is completely enclosed when the open ends of the assembly are closed by detachable covers or other units of the system.

The direction of the cables relatively to the box remains as usual, viz. parallel to the box faces and to the links of a straight through connection. Consequently the cables of the assembled series of boxes just described extend in parallel but spaced planes. It is convenient to arrange the assembly as a vertical pile; which economizes horizontal space and causes all the cables of the pile to extend therefrom horizontally. Moreover, it is preferred that such horizontal cables extend initially from the pile in one vertical plane, which is their logical disposition in a mine passage.

Seeing that the number of electrical connections between cables can be increased indefinitely by providing the appropriate number of boxes in the assembly, it is not important in the case of the invention to provide many cable connections to each box. In fact advantages are gained by providing only two for each box, positioned respectively at opposite sides of a quadrilateral box, and in line with one another. This arrangement has the advantage, for example, of bringing all the cables of a vertical pile of boxes into the single vertical plane mentioned above. The remaining two sides of the box may accordingly be formed as plain enclosing walls except in so far as such plain construction is modified to accommodate bolts, or otherwise to provide the connective formation. The first mentioned opposite sides of the box, which may conveniently be designated the ends of the box, are constructed suitably for the mechanical connection of cables and the connection of the leads of such cables to terminals; which latter are positioned in the chamber space suitably to be accessible through an unclosed one of the face apertures for connecting thereto the links by which the electrical connection of the cables is effected. In this respect the straight through connection of the two-way box of the invention by links connecting sets of terminals at the opposite ends of the box does not necessarily differ from that in known junction boxes; the linking being between the terminal sets of the one box. However, for making the electrical connection between two such junction boxes mechanically connected face to face as above described, the links are positioned transversely to the faces of the boxes and bridge the space between a terminal set in one box and a terminal set in another box; passsing for that purpose through the common aperture of the connected boxes. Since curved links are undesirable, the terminal sets are so positioned in the face elevation of the chamber space that straight links connected thereto may pass perpendicularly through said common aperture.

It is convenient to provide links of two patterns, one for connecting terminals in the same box and the other for connecting the terminals of one box with those of the box associated therewith. These patterns are here distinguished by the terms "alined" and "transverse" respectively. The invention provides terminals constructed to enable either kind of link to be attached to them with equal facility, and without bending the link. For this purpose, the body or block of the terminal is provided, as usual, with a plane clamping face for the flat end of a link to lie against, and a screw extending perpendicularly to said face to receive the clamping nut; and is also formed with a second such clamping face and screw combination at right angles to the first. Either an alined link or a transverse link, or both, may be attached to this form of terminal. The screw of the second mentioned combination may be the screw-threaded stem of the terminal that passes through the insulating terminal plate; and the block may be capable of being turned on said stem.

The invention comprises an alined link having between its ends a lateral extension shaped suitably to perform the function of an electrical contact when brought in association with a complementary contact by relative movement in the direction of the lateral extension. Preferably the lateral extension is formed with a pair of surfaces inclined to its direction and thereby adapted to make wedging contact with the complementary contact device; and the preferred form of the link is one bent to form a V-shaped hump extending laterally to its length.

According to a further feature of the invention, the two-cable junction box is constructed in halves symmetrical about a plane which is perpendicular to the plane faces and to a line between the ends of the box. The halves are thus approximately U or Y shaped in face view; and the parallel arms of the U or Y are provided with means for securing them together when they are abutted end to end to form the whole box. Such means may consist of bolts seated in both holes extending from the free end faces of the arms and parallel with the length of the arms.

These half boxes are in many respects the equivalent of the cable couplers described above and have the same advantage that each can be completely secured to and sealed with its cable before being taken underground.

The junction box or coupler is usually provided with a sealing chamber or sealing chambers in accordance with common practice. A novel feature provided by the invention is the presence of an inward flange between the sealing chamber and the chamber of the junction box or the space of the coupler. The insulating terminal plate is removably attached to that face of said flange facing towards the box chamber of the coupler space; so facilitating the connection of the cable leads as described hereafter.

The invention further comprises units of the junction system, other than the junction boxes and combinations of the boxes with such units, as hereafter described.

The accompanying drawings illustrate the invention. Therein:

Figure I is a perspective view of a cable coupler or half junction box, with some parts displaced.

Figure II is a similar view of a whole junction box.

Figure III shows the construction of the terminals.

Figure IV is a side elevation of two junction boxes joined face to face.

Figure V shows a modification of the Fig. IV assembly.

Figure VI illustrates the use of the V-humps of the links.

Figure VII shows an assembly of several units of the system.

Referring first to Fig. I, 2 indicates a cable coupler which in plan is of a general U or Y shape comprising parallel legs 3, 3 extending from a body portion 4 and separated by a space 5. The portion 4 is hollow to provide the sealing chamber 6 that receives the separated conductors 7 of a cable 8. The plugged holes 9 are for introducing sealing compound into chamber 6.

Between the space 5 and the chamber 6 is an inward flange 10 providing a seating surface 11 for the insulating terminal plate 12, which is removably attached thereto by screws 13. On said terminal plate are mounted the set of terminals 14; to the back ends 15 (Fig. III) of which the cable conductors 7 are severally secured. Said terminals are positioned suitably to enable their front ends to be readily accessible from the faces of the box constituted by the assembly of two couplers.

The terminal construction, shown in detail in Fig. III, comprises a socket 15 seated on the back face of the terminal plate 12 and set-screws 16 for securing the conductor in the socket. Integral with the socket is a stem 17 that passes through the terminal plate 12. A bored block 18 is passed onto said stem to bear against the front face 19 of the terminal plate and is clamped thereon by the nut 20 on the stem. Said block provides two flat clamping faces, viz. 21 at its outer end and 22 at its side; and from the latter there extends a stud 23 carrying a clamping nut 24.

The outer end face 25 of the body portion 4 (shown more clearly in Fig. II) is adapted for the connection thereto of a cable gland 26 secured to it in any convenient manner as by the usual nuts 27 on studs 28.

The upper and lower surfaces 29, 30 of the coupler are formed as plane jointing faces. Vertical bolt holes 31, 32 are provided to receive bolts or studs for connecting the junction box formed of two couplers, to other members having similar jointing faces and bolt holes disposed in a similar pattern; and recesses 33 are provided for the accommodation of the heads or nuts of such bolts. Other bolt holes 34 are provided, each extending from the outer flat face 35 of each leg 3 to the recess 33 for the head or nut of the bolt 36.

It will be evident that a cable coupler as described is suitable to be affixed to its cable 8 in a workshop before being taken underground. Because the insulated terminal plate 12 is brought into contact with its seating face 11 by moving it towards the right in Fig. I, whilst the cable leads 7 are moved in the opposite direction to meet it, the ends of said leads can be prepared by shaping them and usually by soldering the terminals to them, as illustrated in the case of the middle lead 7 shown in Fig. I, at the same time that the gland 26 is secured to the cable. It is then a simple matter to bring the prepared leads and the holes in the terminal plate 12 into register and to secure them together, when the gland 26 is being brought into position.

A junction box, shown in Fig. II, and indicated generally by 37 is formed by assembling two such cable couplers 2, $2^a$ so that each coupler forms one half of the box. They are assembled with their faces 35 in contact and secured together by the aforesaid bolts 36 in the holes 34. The junction box 37 thus constituted has the form of a frame surrounding a single chamber space 38 made up of the spaces 5, 5 of the respective couplers and extending completely through the frame. The upper faces 29, 29 of the two couplers unite to form the single plane jointing face 39 of the frame, surrounding the aperture 40 at one face of the frame. Similarly the two faces 30, 30 of the individual couplers unite to form the single plane jointing face $39x$ of the junction box surrounding the aperture $40x$ at the other face of the frame.

For making electrical connection between the cables 8 and $8^a$, the respective sets of terminals 14, $14^a$ are connected in the usual way by links 41 extending materially parallel with the cables. These links are made of flat strip, perforated at the ends with holes 42; and it is to receive such links that the studs 23 and the clamping faces 22 of the terminals are provided; onto the former of which the perforated link ends are passed and clamped against the latter by the nuts 24 of said studs.

43 indicates a standard cover suitable for closing in the apertures 40 and $40x$ of the frame chamber 38; said cover being standardized in that it is formed at at least one side with a jointing face 44 complemental to the junction box faces 39 and $39x$, and with bolt holes 45, 46, 47, 48 arranged in the same pattern as the bolt holes 31, 32, $31^a$, $32^a$ of the junction box.

The simple straight-through junction box so far described is closed and complete for use by bolting on two such standard covers, one above and one below.

The principal utility of the junction box however arises from its capacity for association with duplicates or substantial duplicates of itself. As shown in Fig. IV this association is brought about by bringing together the jointing faces 39 of at least two such boxes indicated respectively by 37, $37x$ and bolting the boxes together by the vertical bolts 49. There is thus produced an enlarged junction box having mechanical connections for four cables 8, $8^a$, $8^x$, $8^{ax}$, and a single chamber space 50 made up of the several chamber spaces 38 of the individual boxes; in which chamber space are enclosed terminal sets 14, $14^a$, $14^x$, $14^{ax}$, one for each such cable, and all available for interconnection by links within the single chamber space 50 to make the electrical connections desired. Let it be the case for instance that in Fig. IV cable 8 is an incoming cable, feeding one outgoing cable $8^a$ from the same junction box 37 and two outgoing cables $8^x$, $8^{ax}$ connected to junction box $37x$. The terminal sets 14 and $14^a$ are connected by the alined links 41 to make the straight-through connection between cable 8 and cable $8^a$. Another set of links viz. the transverse links 51, connects the terminal set 14 with the terminal set $14^x$; this set of links passing out of box 37 into box $37x$ through the common aperture 40 of said boxes. The set of links $41x$ which connects and is alined with the cables $8^x$ and $8^{ax}$ seats on the clamping faces 22 of the terminals $14^x$ and $14^{ax}$; said faces 22 however being directed downward by rotating the blocks 18 through 180° to position said alined links clear of the transverse links 51. The latter are seated against the clamping faces 21 and are secured by the nuts 52. More than the two boxes described may be similarly assembled, in which case it is convenient to provide a continuous line of transverse links on one side: to have an alined link at the top and the bottom of the pile; and to provide as many transverse links on the other side as may be necessary. The assembled boxes form a vertical pile while the cables extend horizontally and are spaced apart in one vertical plane. The same two standard covers 43 that completely enclose the chamber space of a single box are still effective to enclose completely the enlarged chamber 50 provided by such a combined pair or greater number of boxes.

A more commonly used method of connection is that shown in Fig. V in which one ingoing cable 8 is connected to two outgoing cables $8^x$ and $8^{ax}$. In that case the electrical connection between cables $8^x$ and $8^{ax}$ are made by the alined links $41x$, and the connection between the boxes by the transverse links 51, both as in the Fig. IV example; but the set of alined links 41 is no longer required. For the latter reason the terminal set $14^a$ is also not required; and the regular half box $2^a$ of Fig. IV can be replaced by the chamber dummy half box 53. This differs from the regular half box or cable coupler in having no means, such as the terminal plate 12 and links 41, for making internal electrical connections; an in not comprising the sealing chamber 6. It is however identical with the regular half box as regards its general U shape: the parallel arms 3, 3 perforated by the lengthwise bolt holes 34; the presence of the vertical bolt holes 31, 32; standard jointing faces 29, 30; and the end jointing face 25 with the studs 28 to receive either a gland or as shown the blank flange 54. A whole box comprising one regular half box or cable coupler and one such dummy half box is suitable for use in any case in which only one cable is required to be electrically connected within the box. A gland is fitted to the dummy half box 53 in cases where it is desired to anchor a cable to said half box without connecting its leads within the box.

Fig. VI shows a unit 55 of the system constructed to co-operate with the above described junction boxes of the system, by mechanical connection thereto and by electrical connection through a switch device. For this purpose the unit 55 is formed with the plane jointing face 56 surrounding an aperture 57 and with the bolt holes 58 arranged in the standard pattern, whereby said unit may be mechanically connected face to face with a junction box 37, as shown and in the same way that two junction boxes are mechanically connected. The electrical connection is made by means of the switch 59, 60; the movable contacts 59 of which are associated with the unit 55 and can be extended through the common aperture 40, 57 to connect with the fixed contacts. The latter consist of the lateral V-humps 60 provided on the alined links 41 between their ends; said humps being directed towards the box aperture 49 to which the unit 55 is to be connected. The movable contacts 59 are correspondingly formed as spring forks which can be withdrawn wholly within the cavity of the unit 55, and are so withdrawn while the unit and the junction box 37 are being mechanically connected; so that there is no need to cut off the current to the junction box during that period.

A combination of units that is frequently required comprises an automatic circuit breaker for a local area and a switch box for a nearby machine. The invention enables this combination to be embodied in the single compact assembly of parts shown in Fig. VII. There the switch box is indicated by 61 and the circuit breaker by 62. Both these units embody the features of the unit 55 described in connection with Fig. VI. That is to say the switch box provides the aperture 63 surrounded by the plane face 64 and the bolt holes such as 65; and the switch contacts 66. The switch box is shown with the usual connection 67 for the trailing cable 68; said connection being electrically coupled to the movable switch contacts 66 by flexible leads 69. 70 is a spring detent for holding the switch closed against a spring 71 tending to open the switch. 72 indicates the usual kind of safety device to prevent the trailing cable 68 from being detached from the switch box while the switch is closed to enable the switch box to form the uppermost element of the assembly. Its face 64 and aperture 63 are at the bottom of its casing.

It is convenient to make the circuit breaker 62 as the base member of the assembly. Its aperture 73 is accordingly on the upper side of its casing; and said aperture 73 is provided with the standard jointing face 74, the standard bolt holes such as 75, to connect with a junction box $37^1$ in which the V-humps 60 are turned downward to co-operate with the switch contacts 76 which in the usual way are held up electrically and fall back by gravity to break the circuit.

The top of the circuit breaker is provided with a second aperture: plane jointing surface; and set of bolt holes to connect the junction box $37^2$ to which the outgoing flexible lead 77 of the circuit breaker is connected.

The electrical circuits are indicated by the heavy dotted line. The main cable $8^1$ is connected to junction box $37^1$. A continuation $8^2$ of the main cable is shown as passing from the other end of box $37^1$. The circuit of the assembly continues from the V-hump 60 of junction box $37^1$ through the circuit breaker and by way of the outgoing lead 77 to box $37^2$. Two outgoing cables $8^3$ and $8^4$ are shown leading from this box $37^2$ to other elements of the area controlled by the circuit breaker. The more local circuit continues through the transverse links 51 which pass from box $37^2$ to the alined links 41 of box $37^3$. The V-humps 60 of said links provide for the switching connection with the switch box 61. The V-humps 60 of box $37^2$ are not used in this circuit, and plain straight links could be substituted for the humped links shown; but it is found convenient to use the humped links in all junction boxes, so that every box is always ready for switching connection with a corresponding switching unit. The drawing also shows a further cable $8^5$, outgoing from box $37^3$.

We claim:

1. An electric cable junction box comprising a frame open at opposite faces and surrounding a chamber space, each of said faces having connective formation surrounding the opening of the face whereby either such face is connectible to one of the faces of a similar junction box, means on each of two opposite sides of said frame for the connection of a cable with its conductors extending into said chamber space, terminal plates in said space disposed parallel to each of said opposite sides, and terminals on said plates connected to the cable conductors, said terminals being in alignment through either face opening with corresponding terminals of a similar adjoining junction box and also in alignment with corresponding terminals on the plate at the other side of the same junction box.

2. The junction box claimed in claim 1, in which the connective formation includes a plane contact surface surrounding the opening and bolt holes extending transversely to the plane surface.

3. The junction box claimed in claim 1, comprising a straight link connected to one of the terminals in the box and extending transversely through one of said openings.

4. The junction box claimed in claim 1, wherein each terminal has means at one end for the attachment thereto of a cable conductor and at the other end has two flat clamping faces each having a clamp screw extending perpendicularly to it, said faces being mutually perpendicular.

5. The junction box claimed in claim 1, having at least one face closed in by a removable cover provided with the connective formation corresponding to that of the box faces.

6. The junction box claimed in claim 1, of quadrilateral form with two opposite sides arranged for connection of cables thereto, the box being divided into halves that are detachably secured together; the division being at a plane perpendicular to the faces and to a line joining the cable ends of the box.

7. An electric cable coupler or half junction box, comprising a body portion with a recess therein, two parallel arms projecting from said body portion and enclosing a substantial space between them so that the coupler is substantially U-shaped in face view, said arms having end faces for abutting against and connectible to the end faces of the arms of another similar coupler, means on said body portion for the attachment of a cable with its conductors extending into the said space, and a terminal plate in said body portion extending transversely to the arms and separating said space from said recess.

8. The coupler claimed in claim 7 comprising a sealing chamber at its body end, an inward flange between the coupler space and said sealing chamber, the terminal plate being removably attached to the face of said flange facing the coupler space.

HARRY GENT.
ROBERT HAMILTON HOPE PRYDE.